(12) United States Patent
Simmons (10) Patent No.: US 8,196,337 B2
(45) Date of Patent: Jun. 12, 2012

(54) FISHING TACKLE WITH A MOTION INDUCING MEMBER

(76) Inventor: David L. Simmons, Sevierville, TN (US)

( * ) Notice: Subject to any disclaimer, the term of this patent is extended or adjusted under 35 U.S.C. 154(b) by 0 days.

(21) Appl. No.: 12/857,221

(22) Filed: Aug. 16, 2010

(65) Prior Publication Data
US 2010/0307048 A1  Dec. 9, 2010

Related U.S. Application Data

(63) Continuation-in-part of application No. 11/846,599, filed on Aug. 29, 2007, now Pat. No. 7,774,975.

(51) Int. Cl.
*A01K 85/00* (2006.01)

(52) U.S. Cl. ............ 43/42.39; 43/42.37; 43/42.47; 43/42.32; 43/42.33

(58) Field of Classification Search .......... 43/42.39, 43/42.37, 42.32, 42.33, 42.47, 42.11, 42.15, 43/42.16, 42.17, 42.19, 42.2, 42.21
See application file for complete search history.

(56) References Cited

U.S. PATENT DOCUMENTS

| | | | | |
|---|---|---|---|---|
| 146,764 A * | 1/1874 | James | | 43/42.2 |
| 149,123 A * | 3/1874 | Hazzard | | 43/42.2 |
| 231,912 A * | 9/1880 | Irgens | | 43/42.33 |
| 1,323,458 A * | 12/1919 | Dills | | 43/42.33 |
| 1,393,790 A * | 10/1921 | Kenney | | 43/42.39 |
| 1,569,993 A * | 1/1926 | Macleod | | 43/42.39 |
| 1,611,117 A * | 12/1926 | Kearns | | 43/42.26 |
| 1,612,264 A * | 12/1926 | Cressey | | 43/42.33 |
| 1,639,863 A * | 8/1927 | Sinclair et al. | | 43/42.32 |
| 1,820,887 A * | 8/1931 | Pflueger | | 43/42.2 |
| 1,849,899 A * | 3/1932 | Wright et al. | | 43/42.25 |
| 1,871,971 A * | 8/1932 | Eppich | | 43/42.2 |
| 1,921,176 A * | 8/1933 | Unkefer | | 43/42.33 |
| 1,975,218 A * | 10/1934 | Worden | | 43/42.21 |
| 1,994,678 A * | 3/1935 | Yarvise | | 43/42.15 |
| 1,997,900 A * | 4/1935 | Waldo | | 43/42.47 |

(Continued)

FOREIGN PATENT DOCUMENTS

GB  2268673  1/1994

(Continued)

OTHER PUBLICATIONS

US PTO Office Action and Notice of References Cited for U.S. Appl. No. 11/846,599 mailed Aug. 20, 2009, 22 pages.

(Continued)

*Primary Examiner* — Darren W Ark
(74) *Attorney, Agent, or Firm* — Knox Patents; Thomas A. Kulaga (57) ABSTRACT

An apparatus for attracting fish including a fin that imparts motion to the tackle when the tackle is deployed and moves relative to water. A weighted body having a cabochon shape includes a fin member that extends past the body. The fin member includes an attachment portion and a fin that has a non-planar configuration. The attachment portion is secured to a flat surface of the body. In one embodiment the fin extends forward and forms an obtuse angle relative to the attachment portion. In another embodiment the fin has two members disposed laterally on opposite sides of the body. The fins are blades that cause the body to spin or rotate when moved relative to the water. In yet another embodiment the fin extends forward and aft relative to the body, and the fin has openings for connecting lines and hooks, thereby replacing the eyelet of other embodiments.

5 Claims, 8 Drawing Sheets

U.S. PATENT DOCUMENTS

| | | | | | |
|---|---|---|---|---|---|
| 2,111,020 | A * | 3/1938 | Arbogast | | 43/42.28 |
| 2,114,342 | A * | 4/1938 | Gardner | | 43/42.25 |
| 2,121,114 | A * | 6/1938 | Beck | | 43/17.6 |
| D110,648 | S * | 7/1938 | Powell | | 43/42.28 |
| 2,134,401 | A * | 10/1938 | Harvey | | 43/42.28 |
| 2,154,756 | A * | 4/1939 | Kvitsky | | 43/42.2 |
| 2,163,666 | A * | 6/1939 | Carter et al. | | 43/42.33 |
| 2,168,894 | A * | 8/1939 | Arbogast | | 43/42.28 |
| 2,289,096 | A * | 7/1942 | Brett | | 43/42.21 |
| 2,309,521 | A * | 1/1943 | Mabee | | 43/42.33 |
| 2,309,902 | A * | 2/1943 | Harvey | | 43/42.37 |
| 2,335,322 | A * | 11/1943 | Taylor | | 43/42.47 |
| 2,350,572 | A * | 6/1944 | Deming | | 43/42.33 |
| 2,423,431 | A * | 7/1947 | Allen | | 43/42.25 |
| 2,503,672 | A * | 4/1950 | Johnson et al. | | 43/42.28 |
| 2,583,942 | A * | 1/1952 | Harvey | | 43/42.37 |
| 2,618,096 | A * | 11/1952 | Wagner | | 43/42.47 |
| 2,627,134 | A * | 2/1953 | Fitzgerald | | 43/42.33 |
| 2,631,397 | A * | 3/1953 | Angell | | 43/42.16 |
| 2,657,495 | A * | 11/1953 | Eppinger | | 43/42.33 |
| 2,686,382 | A * | 8/1954 | Fisher | | 43/42.28 |
| 2,741,058 | A * | 4/1956 | Allman et al. | | 43/42.39 |
| 2,750,703 | A * | 6/1956 | Puste | | 43/42.21 |
| 2,753,651 | A * | 7/1956 | Fisher | | 43/42.09 |
| 2,828,572 | A * | 4/1958 | Sargent | | 43/42.39 |
| 2,886,913 | A * | 5/1959 | Stanley | | 43/42.19 |
| 2,909,863 | A * | 10/1959 | Rector et al. | | 43/42.39 |
| 2,933,847 | A * | 4/1960 | Frasure | | 43/42.33 |
| 2,952,936 | A * | 9/1960 | White | | 43/42.21 |
| 3,031,792 | A * | 5/1962 | Swenson | | 43/42.2 |
| 3,060,620 | A * | 10/1962 | Binkowski | | 43/42.37 |
| 3,122,853 | A * | 3/1964 | Koonz et al. | | 43/42.33 |
| 3,245,171 | A * | 4/1966 | Henry | | 43/42.33 |
| 3,367,059 | A * | 2/1968 | Puls et al. | | 43/42.2 |
| 3,367,058 | A * | 2/1968 | Abercrombie | | 43/42.33 |
| 3,528,189 | A * | 9/1970 | Lilley, Jr. | | 43/42.33 |
| 3,540,144 | A * | 11/1970 | Gurka | | 43/42.33 |
| 3,568,354 | A * | 3/1971 | Yacko | | 43/17.6 |
| 3,590,514 | A * | 7/1971 | Begley | | 43/42.37 |
| 3,631,625 | A * | 1/1972 | Castner | | 43/42.33 |
| 3,693,275 | A * | 9/1972 | Craig | | 43/42.21 |
| 3,724,117 | A * | 4/1973 | Flanagan, Jr. | | 43/42.39 |
| 3,729,850 | A * | 5/1973 | Waters, Jr. | | 43/42.47 |
| 3,757,451 | A * | 9/1973 | Cottle | | 43/42.28 |
| 3,769,738 | A * | 11/1973 | Begley | | 43/42.26 |
| 3,803,747 | A * | 4/1974 | Cartwright | | 43/42.28 |
| 3,824,732 | A * | 7/1974 | Boone | | 43/42.19 |
| 3,855,722 | A * | 12/1974 | Moore | | 43/42.37 |
| 3,862,510 | A * | 1/1975 | Peterson | | 43/42.2 |
| 3,883,979 | A * | 5/1975 | Williams, Jr. | | 43/42.28 |
| 3,914,895 | A * | 10/1975 | Mize | | 43/42.28 |
| 3,942,281 | A * | 3/1976 | Hill | | 43/42.39 |
| 3,959,912 | A * | 6/1976 | Lee | | 43/42.37 |
| 4,033,063 | A * | 7/1977 | Mize | | 43/42.28 |
| 4,037,346 | A * | 7/1977 | Holst | | 43/42.2 |
| 4,038,774 | A * | 8/1977 | Misiak | | 43/42.47 |
| 4,074,454 | A * | 2/1978 | Cordell, Jr. | | 43/42.28 |
| 4,141,171 | A * | 2/1979 | Muddiman | | 43/42.47 |
| 4,199,888 | A * | 4/1980 | Barnes | | 43/42.39 |
| 4,201,008 | A | 5/1980 | Sparkman | | |
| 4,215,506 | A * | 8/1980 | LeBoeuf | | 43/42.28 |
| 4,236,342 | A * | 12/1980 | Saia | | 43/17.6 |
| 4,307,531 | A * | 12/1981 | Honse | | 43/42.32 |
| 4,335,495 | A * | 6/1982 | Buchanan | | 43/42.53 |
| 4,429,482 | A * | 2/1984 | Honse | | 43/42.32 |
| 4,501,086 | A * | 2/1985 | Bunce | | 43/42.2 |
| 4,619,067 | A * | 10/1986 | West | | 43/42.28 |
| 4,638,586 | A * | 1/1987 | Hall | | 43/42.28 |
| 4,712,325 | A * | 12/1987 | Smith | | 43/42.28 |
| 4,738,047 | A * | 4/1988 | Ryan | | 43/42.39 |
| 4,741,120 | A * | 5/1988 | Cota et al. | | 43/42.33 |
| 4,790,100 | A * | 12/1988 | Green, Sr. | | 43/42.37 |
| 4,815,229 | A * | 3/1989 | Nicholson, III | | 43/42.47 |
| 4,827,660 | A * | 5/1989 | Dudeck | | 43/42.39 |
| 4,862,629 | A * | 9/1989 | Ryan | | 43/42.39 |
| 4,862,631 | A * | 9/1989 | Wilson et al. | | 43/42.33 |
| 4,888,905 | A * | 12/1989 | Garr | | 43/17.6 |
| 4,908,975 | A * | 3/1990 | Root et al. | | 43/42.39 |
| 4,922,646 | A * | 5/1990 | Basgal | | 43/42.33 |
| 4,972,623 | A * | 11/1990 | Delricco | | 43/17.6 |
| 5,016,387 | A * | 5/1991 | Beaupre | | 43/42.33 |
| 5,038,512 | A * | 8/1991 | Gaal | | 43/42.47 |
| 5,125,182 | A * | 6/1992 | Holder | | 43/42.36 |
| 5,133,146 | A * | 7/1992 | Stecher | | 43/42.47 |
| 5,167,089 | A * | 12/1992 | Schriefer | | 43/42.28 |
| 5,195,269 | A * | 3/1993 | Black et al. | | 43/42.25 |
| 5,207,016 | A * | 5/1993 | Pate | | 43/42.28 |
| 5,209,008 | A * | 5/1993 | Kasznica | | 43/42.53 |
| 5,245,783 | A * | 9/1993 | Cumiskey | | 43/42.37 |
| 5,251,395 | A * | 10/1993 | Wicklund | | 43/42.25 |
| 5,327,671 | A * | 7/1994 | Rosek | | 43/42.19 |
| 5,361,531 | A * | 11/1994 | Rodrigues | | 43/42.28 |
| 5,377,443 | A * | 1/1995 | Giray et al. | | 43/42.33 |
| 5,412,900 | A * | 5/1995 | Rosek | | 43/42.2 |
| 5,628,140 | A * | 5/1997 | Hnizdor | | 43/42.25 |
| 5,667,739 | A * | 9/1997 | Kato | | 264/50 |
| 5,673,508 | A * | 10/1997 | Snyder | | 43/42.37 |
| 5,862,623 | A * | 1/1999 | MacPherson | | 43/42.24 |
| 5,950,345 | A * | 9/1999 | Kilander | | 43/42.32 |
| 5,960,580 | A * | 10/1999 | Link | | 43/42.53 |
| 6,003,264 | A * | 12/1999 | Hnizdor | | 43/42.33 |
| 6,009,658 | A * | 1/2000 | Firmin | | 43/42.37 |
| 6,018,902 | A * | 2/2000 | Gudermuth et al. | | 43/42.32 |
| 6,029,388 | A * | 2/2000 | Yokogawa et al. | | 43/17.6 |
| 6,112,450 | A * | 9/2000 | Studanski | | 43/42.03 |
| 6,122,855 | A * | 9/2000 | Heuke | | 43/42.32 |
| 6,145,239 | A * | 11/2000 | Hirahara et al. | | 43/42.34 |
| 6,158,161 | A * | 12/2000 | Rossman | | 43/42.21 |
| 6,182,391 | B1 * | 2/2001 | Hubbard | | 43/42.33 |
| 6,192,616 | B1 * | 2/2001 | Kent | | 43/42.32 |
| 6,205,697 | B1 * | 3/2001 | Kent | | 43/42.53 |
| 6,301,823 | B1 * | 10/2001 | Monticello et al. | | 43/42.33 |
| 6,393,757 | B2 * | 5/2002 | Bomann | | 43/42.24 |
| 6,418,659 | B1 * | 7/2002 | Shelton | | 43/42.28 |
| 6,546,666 | B2 * | 4/2003 | Schultz et al. | | 43/42.47 |
| 6,564,499 | B1 * | 5/2003 | Firmin | | 43/42.26 |
| 6,591,543 | B2 * | 7/2003 | Sabine | | 43/42.19 |
| D488,206 | S * | 4/2004 | Becker | | D22/126 |
| 6,912,808 | B1 * | 7/2005 | Mak | | 43/42.47 |
| D510,976 | S * | 10/2005 | Becker | | D22/144 |
| 6,962,641 | B2 * | 11/2005 | Chocklett et al. | | 43/42.33 |
| 6,978,571 | B1 * | 12/2005 | Nemire | | 43/42.17 |
| 7,028,430 | B2 * | 4/2006 | Gironda | | 43/42.39 |
| 7,140,145 | B1 * | 11/2006 | Hughes | | 43/42.28 |
| 7,216,455 | B2 * | 5/2007 | Becker | | 43/42.37 |
| 7,260,913 | B2 * | 8/2007 | Becker | | 43/42.39 |
| 7,322,150 | B1 * | 1/2008 | Kent | | 43/42.37 |
| 7,621,068 | B1 * | 11/2009 | Renosky | | 43/42.47 |
| 7,627,978 | B2 * | 12/2009 | Davis | | 43/42.47 |
| 7,707,764 | B1 * | 5/2010 | Osburn | | 43/17.6 |
| 7,726,062 | B2 * | 6/2010 | Davis | | 43/42.47 |
| 7,874,094 | B2 * | 1/2011 | Brevig | | 43/42.2 |
| 2001/0045048 | A1 * | 11/2001 | Johnson | | 43/42.39 |
| 2001/0047608 | A1 * | 12/2001 | Cox | | 43/42.19 |
| 2002/0157300 | A1 * | 10/2002 | Saul | | 43/42.33 |
| 2005/0086849 | A1 * | 4/2005 | Perrick | | 43/42.47 |
| 2005/0246940 | A1 * | 11/2005 | Jones et al. | | 43/42.47 |
| 2006/0042150 | A1 * | 3/2006 | Roh | | 43/42.37 |
| 2006/0123689 | A1 * | 6/2006 | Lange | | 43/42.32 |
| 2006/0191186 | A1 * | 8/2006 | Perrick | | 43/42.47 |
| 2008/0115403 | A1 * | 5/2008 | Shelton et al. | | 43/42.24 |
| 2009/0000177 | A1 * | 1/2009 | Johnson et al. | | 43/42.32 |
| 2009/0056195 | A1 | 3/2009 | Simmons et al. | | |
| 2009/0056196 | A1 * | 3/2009 | Korteweg | | 43/42.39 |
| 2009/0107027 | A1 * | 4/2009 | Partridge | | 43/42.19 |

FOREIGN PATENT DOCUMENTS

| | | | | |
|---|---|---|---|---|
| GB | 2268673 | A * | 1/1994 | |
| GB | 2335129 | | 9/1999 | |
| GB | 2335129 | A * | 9/1999 | |
| JP | 04066037 | | 3/1992 | |
| JP | 04066037 | A * | 3/1992 | |
| JP | 04211316 | | 8/1992 | |
| JP | 04211316 | A * | 8/1992 | |
| JP | 05007441 | | 1/1993 | |
| JP | 05007441 | A * | 1/1993 | |
| JP | 05137479 | | 6/1993 | |

| | | | | |
|---|---|---|---|---|
| JP | 05137479 A | * | 6/1993 | |
| JP | 05336863 | | 12/1993 | |
| JP | 05336863 A | * | 12/1993 | |
| JP | 06253709 | | 9/1994 | |
| JP | 06253709 A | * | 9/1994 | |
| JP | 08066138 | | 3/1996 | |
| JP | 08066138 A | * | 3/1996 | |
| JP | 08126450 | | 5/1996 | |
| JP | 08126450 A | * | 5/1996 | |
| JP | 09266737 A | * | 10/1997 | |
| JP | 10127210 | | 5/1998 | |
| JP | 10127210 A | * | 5/1998 | |
| JP | 10215732 A | * | 8/1998 | |
| JP | 11276023 | | 10/1999 | |
| JP | 11276023 A | * | 10/1999 | |
| JP | 2000125701 | | 5/2000 | |
| JP | 2000125701 A | * | 5/2000 | |
| JP | 2000139274 A | * | 5/2000 | |
| JP | 2000209981 | | 8/2000 | |
| JP | 2000209981 A | * | 8/2000 | |
| JP | 2000217467 | | 8/2000 | |
| JP | 2000217467 A | * | 8/2000 | |
| JP | 2001000077 A | * | 1/2001 | |
| JP | 2002325525 | | 11/2002 | |
| JP | 2002325525 A | * | 11/2002 | |
| JP | 2003250391 A | * | 9/2003 | |
| JP | 2003274799 | | 9/2003 | |
| JP | 2003274799 A | * | 9/2003 | |
| JP | 2005245245 A | * | 9/2005 | |
| JP | 2006115774 A | * | 5/2006 | |
| JP | 2006141285 | | 6/2006 | |
| JP | 2006141285 A | * | 6/2006 | |

OTHER PUBLICATIONS

Reply to US PTO Office Action filed Nov. 20, 2009, for U.S. Appl. No. 11/846,599.

* cited by examiner

FISHING TACKLE WITH A MOTION INDUCING MEMBER

CROSS-REFERENCE TO RELATED APPLICATIONS

This application is a continuation-in-part of prior application Ser. No. 11/846,599, filed Aug. 29, 2007, to be issued as U.S. Pat. No. 7,774,974 on Aug. 17, 2010.

STATEMENT REGARDING FEDERALLY SPONSORED RESEARCH OR DEVELOPMENT

Not Applicable

BACKGROUND OF THE INVENTION

1. Field of Invention

This invention pertains to fishing tackle. More particularly, this invention pertains to tackle that attract fish by motion induced by a member attached to a body.

2. Description of the Related Art

Fishing is both a sport and a livelihood for many. To catch fish with a hook, the fish must be enticed to strike the hook such that the barb of the hook impales the flesh of the fish. To entice fish, hooks often hold bait or are integrated or attached to a lure, which is an object that resembles fish prey.

Known fishing lures have a variety of shapes and configurations. In general, these shapes and configurations are intended to attract and entice fish to strike the lure. In many cases, lures are designed to imitate the prey of the fish attempted to be caught. Such prey includes a vulnerable fish, a worm, or an insect Generally, lures attract fish by the appearance of the lure and/or the movement of the lure through or on the water. With respect to appearance, the shape, configuration, color, and reflectance, among other attributes may attract a specific species of fish. With respect to movement, some lures float like a bug on the surface of the water, other lures move vertically like prey, and still others wiggle in the water as they move horizontally, which mimics the movement of a fish.

BRIEF SUMMARY OF THE INVENTION

According to one embodiment of the present invention, an apparatus for attracting fish is provided. A fishing tackle includes a motion inducing member that causes the tackle to move in a manner that simulates a live bait. The tackle includes a body with a fishing line attachment point and a fin member. The body has an ovoid shape with a flat surface, such as a glass bead or cabochon. A glass cabochon has a convex or domed top and a flat bottom with an elliptical shape. In the embodiment where the cabochon is glass, the body is lead free. Lead is a toxic material and it is desirable to not introduce elemental lead into the environment. The fin member includes a sheet-like fin that protrudes from the body. In one embodiment the fin protrudes from the forward portion of the body. The forward portion is the portion that is proximate the leading portion of the tackle when the tackle moves through the water. The fin impinges on the water that is moving relative to the tackle, thereby causing instability of the tackle, which moves erratically. In another embodiment, the fin has two members on opposite lateral sides of the body. The fin members cause the body to rotate as the tackle moves relative to the water. In yet another embodiment, the fin protrudes normal to the surface of the body obliquely to the longitudinal axis of the tackle. The longitudinal axis of the tackle is defined as a line passing through the forward and aft portions of the tackle.

In one embodiment the tackle is a lure. A fishing hook is secured to the body proximate a flat surface of the body. The shank is positioned in a channel in the body. A fin member covers the channel and has a fin that protrudes forward of the body. The fin is a thin sheet that in one embodiment is malleable such that the fin is deformable into a non-planar shape. In another embodiment the fin has a preformed shape that is non-planar. When the tackle is pulled through water, the water impinges the fin, which deflects the water and causes the tackle to be unstable and move about with an erratic motion.

In another embodiment, the tackle is a sinker or a weight. The sinker includes a tube positioned in a channel in the body. Inside the tube is a shaft that has eyelets on its distal ends. The shaft is free to rotate within the tube. A fin member covers the channel. In one embodiment, the fin member has a single fin that protrudes forward of the tackle. When the tackle is in use, the fin has a non-planar shape. In another embodiment, the fin member has a pair of fins that protrude laterally from the body, that is, the fins protrude normal to the longitudinal axis of the tube. In such an embodiment the protruding fins are twisted such that the tackle spins about its axis when the tackle moves relative to the water.

In another embodiment, the tackle has a fin member that protrudes away from the plane of the flat surface of the body. In this embodiment the fin member is oblique to the longitudinal axis of the tackle. In various embodiments the fin member has two sections. One section is substantially perpendicular to the flat surface of the body and the second section at the distal end of the first section and substantially parallel to the flat surface of the body. In various embodiments, the angles between the two sections and the flat surface of the body are varied, as is the oblique angle between the first section and the longitudinal axis of the body, to control the amount of motion induced in the tackle as the tackle moves relative to the water during use.

In yet another embodiment, the tackle has a fin member that protrudes towards the forward end of the body, which is clear or translucent. The forward end of the fin includes a forward opening configured to connect to a lead line or fishing line. A reflective sheet is positioned proximate the attachment portion of the fin member and the surface of the body is adhered to the attachment portion such that the reflective sheet reflects light through the body. In one such embodiment the fin also protrudes towards the aft end of the body. The aft end of the fin includes an aft opening configured to connect to a fishhook. In one embodiment of the tackle, a second body is attached to the opposite side of the attachment portion of the fin member, whereby the attachment portion is sandwiched between the two bodies.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An apparatus for attracting fish is disclosed. A fishing tackle, generally referred to as item 110, includes a fin, generally referred to as item 1112. The fin 1112 imparts motion to the tackle 1100 when the tackle 1100 moves through the water.

Figure 1:
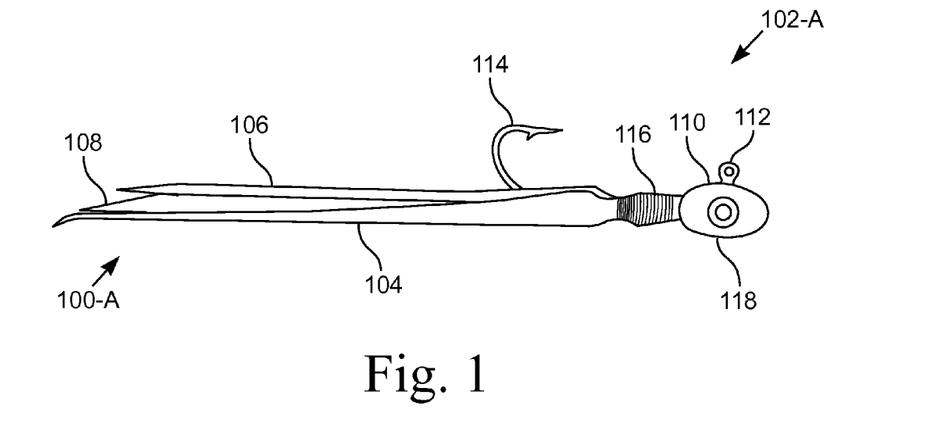
FIG. 1 is a side view of one embodiment of a lure with one embodiment of an iridescent tail.
Figure 2:
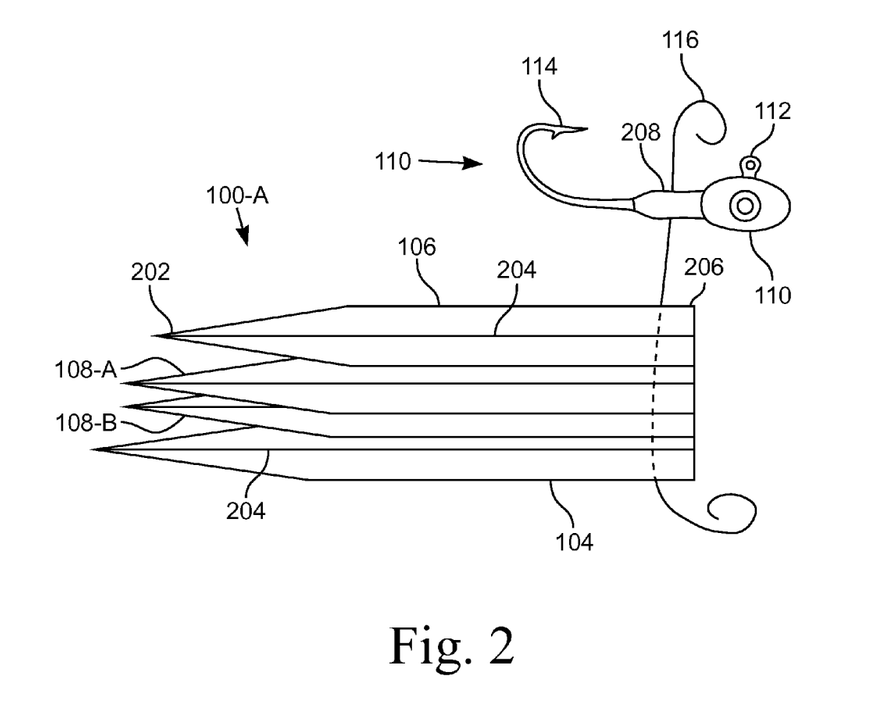
FIG. 2 is a plan view of one embodiment of a lure with the various components spread out in an unassembled configuration.

FIG. 1 illustrates a side view of one embodiment of a lure 102-A with one embodiment of an iridescent tail 100-A. FIG. 2 illustrates a plan view of the lure 102-A with the various components spread out, thereby showing the construction of the lure 102-A. The illustrated lure 102-A includes a jig 110 that has a head 118 with a eye 112 and a hook 114. The head 118 of the jig 110 is a lead sinker with the hook 114 molded into the head 118. A portion of the shank of the hook 114 is surrounded by the shank 208 of the jig 110. The eye 112 provides an attachment point for connecting a fish line to the lure 102-A. In the illustrated embodiment, the jig 110 resembles the head of a small fish. In another embodiment, the head 118 is replaced with a glass bead and the eye 112 is the eye of the hook that extends through the glass bead. In such an embodiment, the glass bead includes a through-opening that receives the shank 208 of the hook 114. The glass bead, in various embodiments, includes materials that reflect light in various patterns and/or includes phosphorescent material that cause the bead to glow when in the water.

The iridescent tail 100-A includes multiple layers 104, 106, 108 of sheets of material that have a longitudinal fold 204. The layers 104, 106, 108 are oblong, with the outboard end 202 having a point and the inboard end 206, which attaches to the shank 208 of the jig 110, being substantially square-cut. The layers 104, 106, 108 have a V-shape with the fold 204 forming the apex of the V-shape. In the assembled configuration of the lure 102-A illustrated in FIG. 1, the outboard end 202 of the layers 104, 106, 108 are separated to form a full shape.

The layers 104, 106, 108 have a progressively shorter length from the outermost layer 104 to the innermost layer 106. The lure 102-A is assembled by stacking the layers 104, 106, 108 and placing the shank 208 of the jig 110 adjacent the fold 204 in the innermost layer 106. A section of line 116 is then wrapped around the layers 104, 106, 108, thereby securing the layers 104, 106, 108 to the shank 208.

In another embodiment, the middle layer 108 does not have a center fold 204 or the center fold 204 extends only a short distance from the inboard end 206. In such an embodiment, the outer layer 104 is forced apart or away from the inner layer 106 proximate the outboard end 202.

The outermost layer 104 of the iridescent tail 100-A is an iridescent film, or sheet. In one embodiment, the innermost layer 106 is also an iridescent film, or sheet and each of the middle layers 108-A, 108-B is a transparent or translucent colored film, or sheet. In various embodiments, each layer 104, 106, 108 is formed of one or more individual sheets. The layers 104, 106, 108 are sufficiently rigid to hold the fold 204 formed in the layers 104, 106, 108.

In various embodiments, the layers 104, 106, 108 have a thickness ranging from approximately 1 to 5 mils, with the layers 104, 106, 108 having a stiffness sufficient for the iridescent tail 100-A to maintain its shape and configuration when attached to the jig 110 as illustrated in FIG. 1.

Iridescent film is a transparent or translucent optical effect film in which the perceived color changes depending on the viewing angle. In one embodiment of iridescent film, multiple, ultra-thin polymer layers alter the path of visible light so that specific wavelengths are reflected while permitting the remainder of the light to be transmitted through the layers. By positioning a colored sheet 108 adjacent an iridescent sheet 104, 106, the iridescent tail 100, when submersed in water, has a multicolored presentation dominated by the color of the colored sheet 108. For example, with the middle layer 108 being yellow, the iridescent tail 100 assumes a predominately yellow color that also appears to be every other color of the rainbow, depending upon the position of the observer. In other embodiments, the middle layer 108 is omitted or is another sheet of iridescent film. In such embodiments, the iridescent tail 100 is more translucent as the tail 100 presents a multitude of colors.

The configuration of the iridescent tail 100, joined at the inboard end 206 and separated slightly at the tail or outboard end 202, aids in attracting fish. The slight separation of the layers 104, 106, 108 traps air when the lure 102 is submerged in water, causing the lure 102 to be unstable. The instability and the varying lengths of the layers 104, 106, 108 aid in causing the lure 102 to move erratically in the water. As the lure 102 moves erratically through the water, the iridescent tail 100 reflects light that is multicolored and continuously changing in color. The erratic movement of the lure 102, in addition to the color display, attracts fish.

In one embodiment, one or more of the iridescent sheets 104, 106, 108 is crumpled, that is, the sheet 104, 106, 108 is crushed such as to form irregular folds and/or wrinkles, and then returned to its elongated, folded shape. In another embodiment, the sheet 104, 106, 108 is textured so as to present a surface that is not flat, but is covered with raised features. The irregular folds and wrinkles result in the sheet 104, 106, 108 having a multitude of almost parallel sections of sheet, with each section having a different color because the sheet sections are not exactly parallel. In such an embodiment, the iridescent tail 100 presents a multitude of colors, simultaneously. In another such embodiment, the middle sheet 108 is a thin sheet that is crumpled and then straightened. The middle sheet 108 is positioned between two translucent sheets 104, 106 that support the thinner middle sheet 108.

Figure 3:
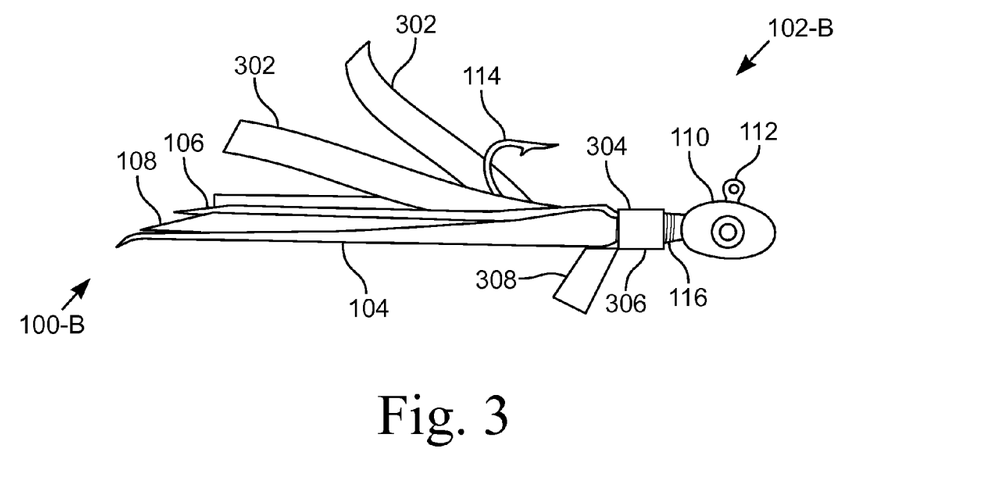
FIG. 3 is a side view of another embodiment of a lure with an embodiment of an iridescent tail with wide ribbons.

FIG. 3 illustrates a side view of another embodiment of a lure 102-B with an embodiment of an iridescent tail 100-B with wide ribbons 302 trailing from the head end 208 of the tail 100-B. The illustrated embodiment includes a plurality of wide ribbons 302 that extend from the inboard end 206 of the layers 104, 106, 108 toward the outboard end 202. The wide ribbons 302 are of different lengths and are formed of an iridescent film. In one such embodiment, the ribbons 302 are thinner in thickness than the outermost layer 104 such that the ribbons 302 are readily displaced and moved by the motion of the lure 100-B in the water. In various embodiments, the ribbons 302 are one or more of an iridescent or colored film.

The embodiment illustrated in FIG. 3 includes a fin assembly 304 that includes at least one fin 308 and a tab 306 that is wrapped around the shank 208 and the iridescent tail 100. In various embodiments, the tab 306 is secured by tape, an adhesive, or a clip. The fins 308 extend downward relative to the lure 102 and, when the lure 102 moves through water, the fins 308 cause the lure 102 to move in an irregular or erratic manner.

Figure 4:
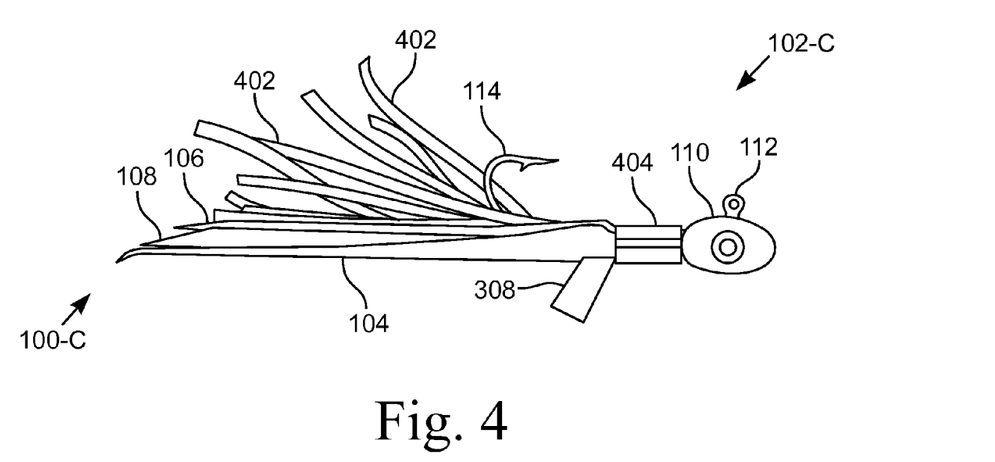
FIG. 4 is a side view of another embodiment of a lure with another embodiment of an iridescent tail with narrow ribbons.

FIG. 4 illustrates a side view of another embodiment of a lure 102-C with another embodiment of an iridescent tail 100-C with narrow ribbons 402 trailing from the head end 208 of the tail 100-C. The illustrated embodiment includes a plurality of narrow ribbons 402 that extend from the inboard end 206 of the layers 104, 106, 108 toward the outboard end 202. The narrow ribbons 402 are of different lengths and are formed of an iridescent film. In one such embodiment, the ribbons 402 are thinner in thickness than the outermost layer 104 such that the ribbons 402 are readily displaced and moved by the motion of the lure 100-C in the water. In various embodiments, the ribbons 402 are one or more of an iridescent or colored film.

The lure 102-C illustrated in FIG. 4 has the iridescent tail 100-C attached to the jig 110 with a connector 402. The iridescent tail 100-C is attached to the shank 208 with a connector 404 that encircles and compresses the tail 100-C to secure it to the shank 208. In one embodiment, the connector 402 is a metal tab that is crimped around the tail 100-C and shank 208. In another such embodiment, the connector 402 is a tab that is formed of a spring steel or other resilient material that encircles the tail 100-C and shank 208.

The embodiment illustrated in FIG. 4 includes at least one fin 308 that extends downward relative to the lure 102. The tab 306 is positioned between the iridescent tail 100-C and the connector 404. The connector 404 secures both the tail 100-C and the tab 306. In another embodiment, the fin assembly 304 is attached to the lure 102 such that the at least one fin 308 is positioned in front of the iridescent tail 100, that is, rather than being dragged through the water, the fin 308 is positioned to dig into the water when the lure 102 is pulled through the water.

Figure 5:
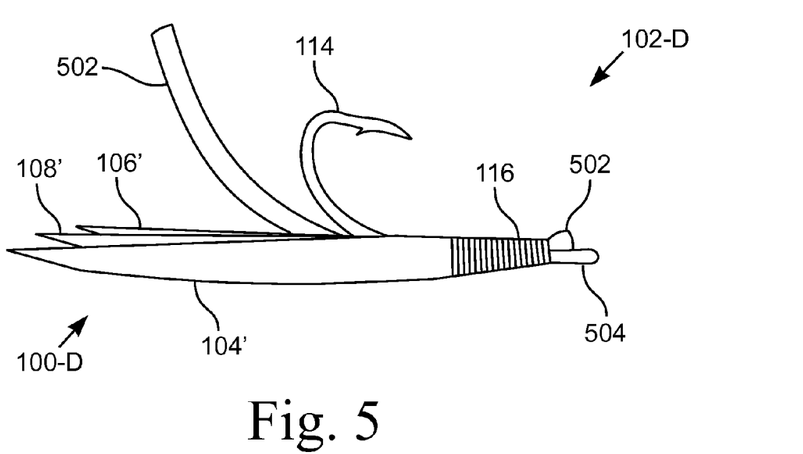
FIG. 5 is a side view of another embodiment of a lure with an embodiment of an iridescent tail with a worm-shaped member.
Figure 6:
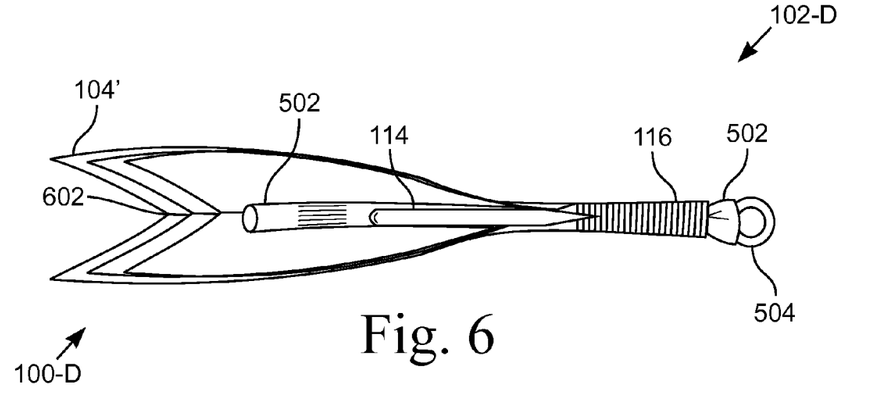
FIG. 6 is a top view of the embodiment of the lure of FIG. 5.

FIG. 5 illustrates a side view of another embodiment of a lure 102-D with an embodiment of an iridescent tail 100-D with a worm-shaped member 502. FIG. 6 illustrates a top view of the embodiment of the lure 102-D of FIG. 5. The illustrated embodiment includes a worm-shaped member 502 extending from the inboard end 206 of the layers 104, 106, 108 toward the outboard end 202. The worm-shaped member 502 is a flexible, elastic material that is readily displaced and moved by the motion of the lure 100-D in the water.

The iridescent tail 100-D includes multiple layers 104', 106', 108' of film with a V-Shaped cut, or notch, 602. The tail 100-D is tied with a line 316 to the shank of hook 114'. The eye 504 of the hook 114' and a small portion of the worm-shaped member 502 extend past the inboard end 206 of the layers 104', 106', 108'.

Figure 7:
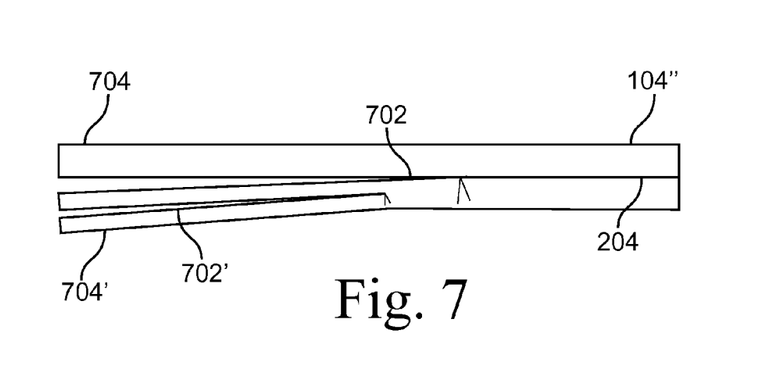
FIG. 7 is another embodiment of a layer showing slits parallel to the longitudinal fold.

FIG. 7 illustrates another embodiment of a layer 104" in which the longitudinal fold 204 extends only partially the length of the layer 104". Although the illustrated layer 104" is the outermost layer 104" of the iridescent tail 100, the illustrated embodiment applies equally to the other layers 106, 108.

The layer 104" includes a first slit 702 that follows the line of the fold 702 toward the outboard end 202 of the layer 104". The slit 702 divides the outboard end 202 of the layer 104" into two strips 704. In the illustrated embodiment, a second slit 702' divides one of the strips 704 into two narrower strips 704'. In other embodiments, the layer 104", 106, 108 includes a fold 204 that extends the full length and one or more slits 702' that are parallel and offset from the fold 204.

An iridescent tail 100 incorporating slits 702 702' in the layers 104", 106, 108 increases the flexibility and resilience of the layers 104", 106, 108. Such an embodiment of an iridescent tail 100 allows the layers 104", 106, 108 to move and be displaced by the water when the lure 102 is submerged. The greater flexibility of the layers due to the slits 702 increases the amount and rate of color change of the iridescent tail 100 as the tail 100 moves through the water.

Those skilled in the art will recognize that the iridescent tail 100 is suitable for attaching to various types of lure bodies without departing from the spirit and scope of the present invention. For example, iridescent tail 100-A, 100-B, 100-C is illustrated attached to a jig 110, and the iridescent tail 100-D is illustrated attached to a hook 114'. The iridescent tail 100 is also suitable for attaching to spinners, surface lures, spoon lures, plugs, wobblers, and various types of hooks and/or sinkers.

In the various embodiments, the layers 104, 106, 108 of the iridescent tail 100 are readily adjustable to a shorter length by cutting each layer 104, 106, 108 to the desired length and having the desired end shape 202, 602. For example, the layers 104, 106, 108 can be cut with scissors to a desired, selected length to better entice a particular type of fish.

Figure 8:
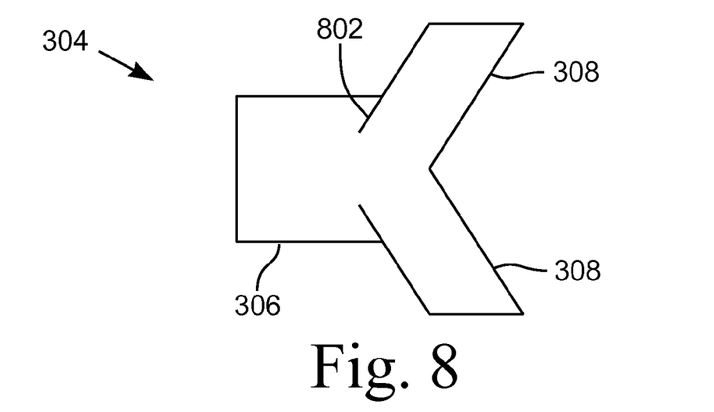
FIG. 8 is a plan view of one embodiment of a fin assembly.

FIG. 8 illustrates a plan view of one embodiment of a fin assembly 304, as it would be when cut from a planar sheet and before being formed into the configuration illustrated in FIGS. 3 and 4. The fin assembly 304 includes a tab 306 and a pair of fins 308. The tab 306 is dimensioned and configured to wrap around, either fully or partially, the shank 208. A portion of the tab 306 is separated from the pair of fins 308 by a pair of slits 802, which allow the tab 306 to assume a substantially cylindrical configuration without causing the pair of fins 308 to assume a similar configuration. The fin assembly 304 is a rigid material that retains its shape and configuration after being bent and/or formed. That is, the tab 306 retains a substantially cylindrical shape and the pair of fins 308 remain bent downwardly after the fin assembly 304 is configured to its final shape.

In one embodiment, the fin assembly 304 is a plastic material that is stiff and rigid, but is sufficiently malleable for the fins 308 to be bent into a downward configuration. In another embodiment, the fin assembly 304 is a thin metal that is stiff and rigid. In such an embodiment, one or more of the fins 308 can be bent into a specific configuration and remain in that configuration when the lure 102 is in the water.

Figure 9:
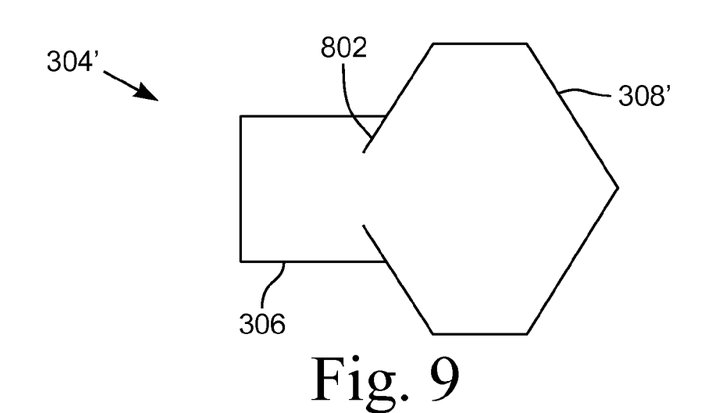
FIG. 9 is a plan view of a second embodiment of a fin assembly.

FIG. 9 illustrates a plan view of a second embodiment of a fin assembly 304'. The illustrated embodiment has a single fin 308' having a polygonal shape. The polygonal shape of the fin 308' provides for a different movement of the lure 102 in the water than with the V-shaped fins 308. In various embodiments, the fin 308' has various shapes, for example, regular and irregular polygons, and oval. The illustrated embodiment is suitable for mounting in the trailing position, as illustrated in FIGS. 3 & 4, or in a leading position where the fin 308' is positioned forward of the tab 306 and/or the iridescent tail 100.

Figure 10:
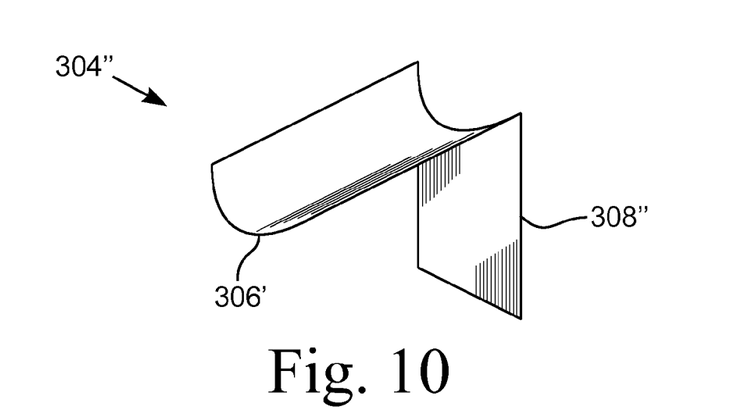
FIG. 10 is a perspective view of a third embodiment of a fin assembly.

FIG. 10 illustrates a perspective view of a third embodiment of a fin assembly 304". In this embodiment, the single fin 308" has a rectangular shape that extends downward away from the shank 208 when the fin assembly 304" is attached to the lure 102. The tab 306' has a half-cylindrical shape that is suitable for being captured by the connector 404 as illustrated in FIG. 4.

Figure 11:
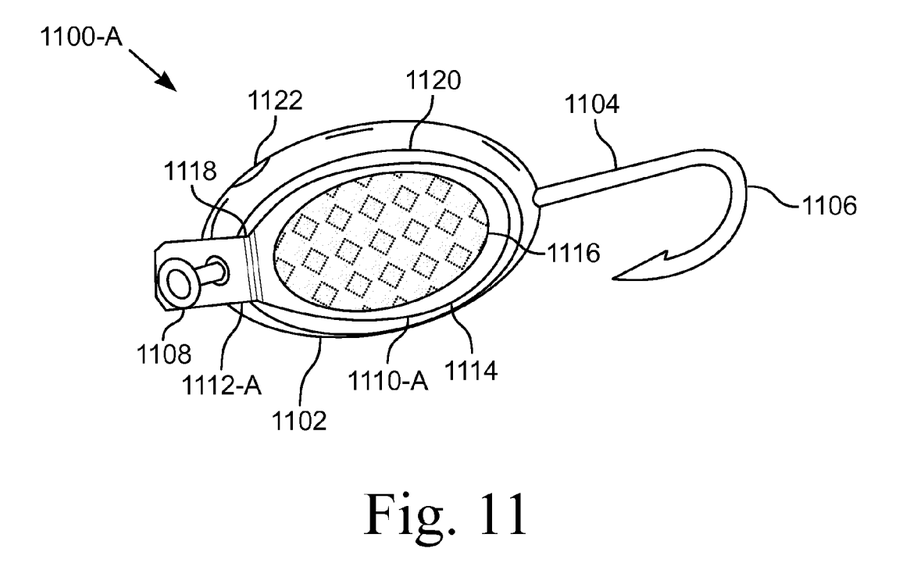
FIG. 11 is a perspective view of one embodiment of a tackle that is a lure with a fin.

FIG. 11 illustrates a perspective view of one embodiment of a tackle 1100-A that is a lure with a fin 1112-A. Fishing tackle 1100 includes lures, sinkers, and other devices that are used when fishing to attract and entice fish to strike. Fish are attracted to tackle 1100 that moves in a manner that simulates the movement of bait, be it a fish or an insect or other animal. The illustrated lure 1100-A includes eyes 1122 that give the lure 1100-A the appearance of a bait fish. In such an embodiment, the body 1102 is colored to simulate a fish and reflective sheet 1116 simulates the scales of a fish.

Figure 15:
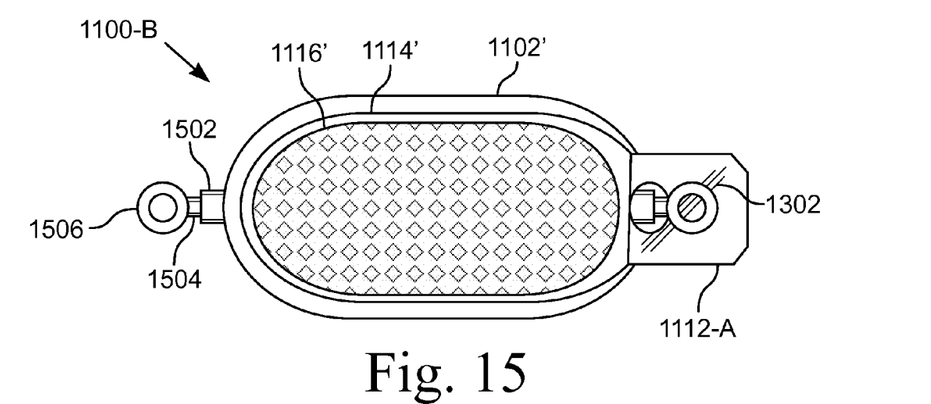
FIG. 15 is a bottom view of another embodiment of a tackle with a fin.
Figure 16:
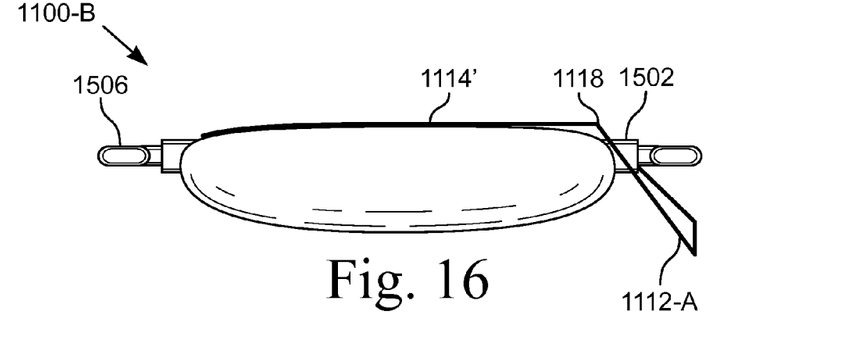
FIG. 16 is a side view of the tackle with the fin.
Figures 17, 18:
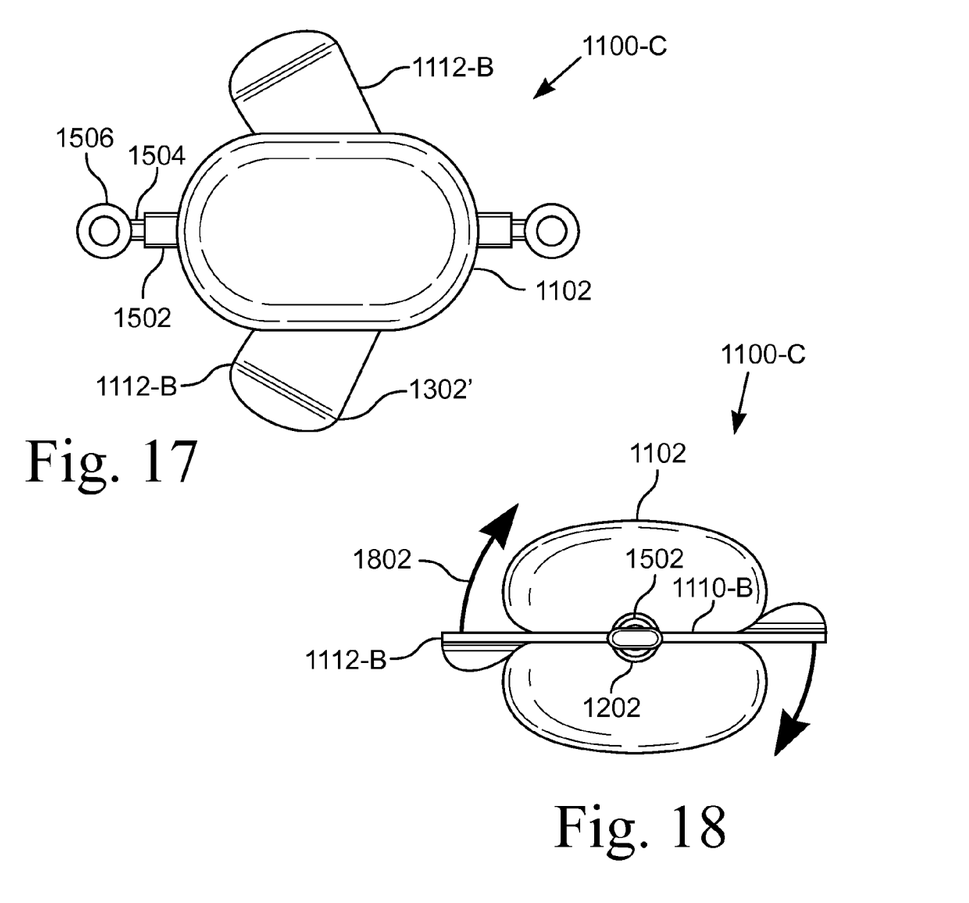
FIG. 17 is a plan view of yet another embodiment of a tackle with a double fin.
FIG. 18 is an end view of the tackle with a double fin.

The tackle 1100-A illustrated in FIG. 11 is a lure with a body 1102, such as a bead that is commonly formed of molten glass. The body 1102 has a surface 1120 that is substantially flat with the remainder of the body 1102 having an ovoid or ellipsoidal shape. In various embodiments, the flat surface 1120 of the body 1102 is almost circular and in other embodiments the body 1102' has an elongated shape such as illustrated in FIGS. 15-17. In one embodiment the body 1102 is a glass bead or glass cabochon. A glass cabochon has a convex or domed top and a flat bottom. The cabochon has an elliptical shape that ranges from circular to oblong. Glass beads and glass cabochons are lead free. Lead is a toxic material and it is desirable to not introduce elemental lead into the environment.

Figure 12:
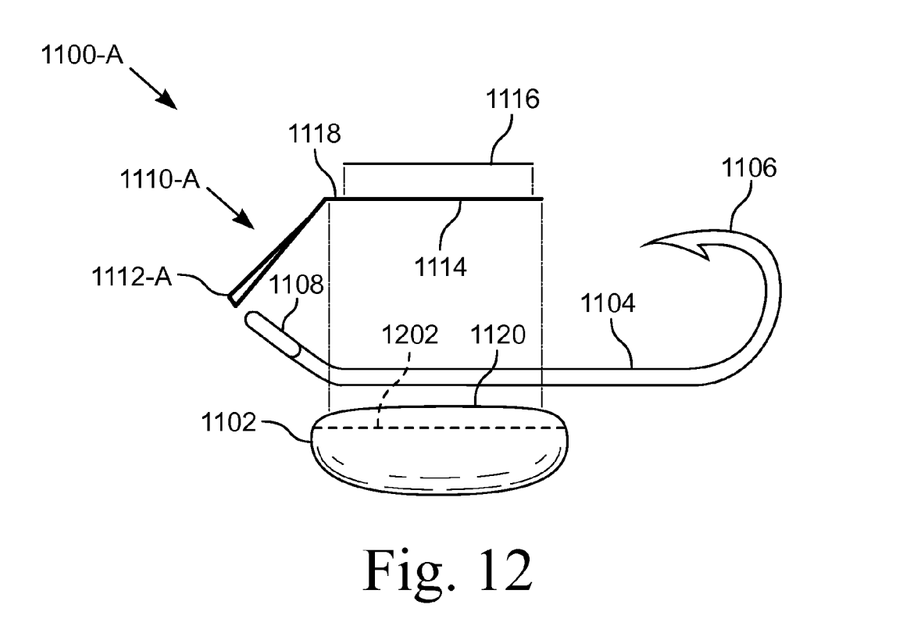
FIG. 12 is an exploded view of the lure with the fin.

FIG. 12 illustrates an exploded view of the lure 1100-A with the fin 1112-A. The lure 1100-A includes a fish hook 1106 with a shaft 1104 that engages a channel, groove, or slot 1202 in the surface 1120 of the body 1102 with the eyelet 1108 extending from the end of the channel 1202 opposite where the hook of the fish hook 1106 extends. The channel 1202 extends from the forward end of the body 1102 to the aft end of the body 1102 with reference to the tackle 1100 when it is deployed in the water with a line connected to the eyelet 1108. The eyelet 1108 is a fishing line attachment point that allows a lead line or a fishing line to attach to the tackle 1100-A. The shank 1104 is secured in the slot 1202 such that the fish hook 1106 is fixed in position relative to the body 1102. As shown in the illustrated embodiment, the orientation of the body 1102 relative to the hook 1106 ensures that the barb of the hook 1106 is oriented upwards as shown in FIG. 12. The weight of the body 1102 causes the body 1102 to hang lower than the eyelet 1108, which results in the barb being oriented upwards.

In the illustrated embodiment the shank 1104 of the fish hook 1106 has a bend that angles the eyelet 1108 away from the body 1102 and away from the plane of the surface 1120 of the bead 1102. In this way the distal end of the shaft 1104 proximate the eyelet 1108 is approximately normal to the fin 1112-A. Although the illustrated embodiment shows an eyelet 1108, those skilled in the art will recognize that the eyelet 1108 is an attachment member that connects a fishing line or a leader to the tackle 1100.

The tackle 1100-A includes a fin member 1110-A that has a fin 1112-A extending from an attachment portion 1114. The fin 1112-A is joined to the attachment portion 1114 at a joint 1118. The fin 1112-A extends away from the body 1102 and the attachment portion 1114 is proximate the surface 1120 of the body 1102. The attachment portion 1114 is secured to the surface 1120 of the body 1102. The attachment portion 1114 is dimensioned to provide a secure attachment of the fin member 1110-A such that the force of water impinging upon the fin 1112-A is insufficient to dislodge the fin member 1110-A from the body 1102. The fin 1112-A is at an obtuse angle with the attachment portion 1114 with the body 1102 positioned within the obtuse angle. In various embodiments, the fin 1112-A is planar or non-planar and/or is positioned square with the forward end of the body 1102 or is offset such that the plane of the fin 1112-A is obliquely oriented to a longitudinal (forward to aft) axis of the tackle 1100-A.

Proximate the attachment portion 1114 is a reflective sheet 1116. With the attachment portion 1114 secured to the surface 1120 of the body 1102, the reflective sheet 1116 sandwiches the attachment portion 1114 between the sheet 1116 and the surface 1120. In one embodiment, the sheet 1116 has reflective properties that simulate the scales of a bait fish. When the lure 1100-A is pulled through the water, light passing through the surface of the water strikes the sheet 1116 and is reflected in a manner that simulates a bait fish moving through the water.

The sheet 1116, the attachment portion 1114, the shank 1104, and body 1102 are secured together. In various embodiments, an adhesive or epoxy is used to secure everything 1102, 1106, 1110, 1116 together.

Figure 13:
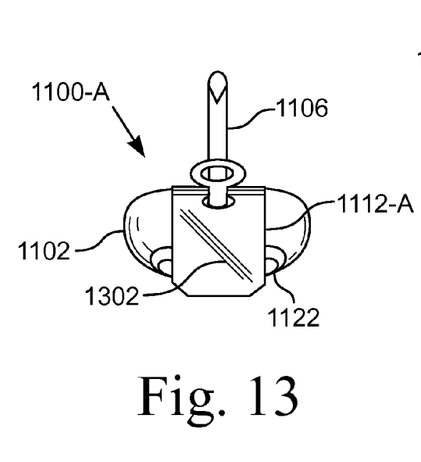
FIG. 13 is a front view of the lure with the fin.

FIG. 13 illustrates a front view of the lure 1100-A with the fin 1112-A. The body 1102 is shown as the tackle 1100-A would be when attached to a leader and in use. In the illustrated embodiment, the fin 1112-A has a twist that results in a fold 1302 diagonally across the face of the fin 1102-A. The fold 1302 is formed by twisting the fin 1112-A between the distal end of the fin 1112-A and the attachment portion 1114, such as when a person grasps the body 1102 with one hand and pinches the end of the fin 1112-A with the fingers of the other hand and then twists. In other embodiments the fin 1112-A is deformed by curling or rolling or otherwise deforming the distal end of the fin 1112-A such that the fin 1112-A is non-planar. In yet another embodiment the fin 1112-A is preformed into a desired non-planar shape.

The fold 1302 deforms the fin 1112-A such that when the tackle 1100-A is suspended from a lead line attached to the eyelet 1108, the water flowing over the tackle 1100-A impinges the deformed fin 1112-A and imposes a side force to the tackle 1100-A. The side force causes the tackle 1100-A to move sideways and pivot relative to the eyelet 1108. The motion of the tackle 1100-A caused by the side force forces the tackle 1100-A into an unstable position. The tackle 1100-A then attempts to return to a stable position, which results in the tackle 1100-A having an irregular oscillatory motion as the tackle 1100-A moves relative to the water. Because the fin 1112-A is positioned between the eyelet 1108 and the center of gravity of the tackle 1100-A, which is forward of the center of gravity, the forces applied to the fin 1112-A tend to cause increased instability compared to a fin positioned aft of the center of gravity.

Figure 14:
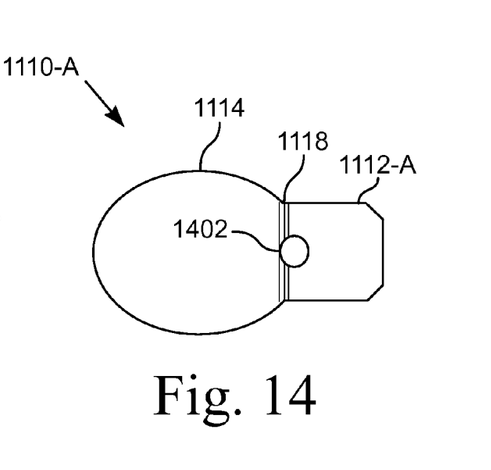
FIG. 14 is a plan view of the fin member.

FIG. 14 illustrates a plan view of the fin member 1110-A. The fin member 1110-A includes a attachment portion 1114 and fin 1112-A joined at a joint, or bend line, 1118. The attachment portion 1114 has a shape that generally conforms to fit with the boundary of the surface 1120 of the body 1102. That is, for a body 1102 that has an oval shape when viewed normal to the surface 1120, the attachment portion 1114 has a corresponding, but smaller, oval shape.

In the illustrated embodiment, the fin 1112-A is substantially rectangular with the distal corners truncated. In other embodiments, the fin 1112-A is rounded or has another shape. The fin 1112-A is sized and has a shape that is sufficient to force the tackle 1100 into an unstable position when the tackle 1100 is moved relative to the water when in typical use.

The fin member 1110, in one embodiment, is a thin sheet of a deformable material, such as a sheet of copper. In such an embodiment, the fin 1112-A is readily deformed into a non-planar configuration or shape. For example, the fin 1112-A is deformed by twisting or otherwise bending the fin 1112-A between the distal end and the joint, or bend line, 1118 between the fin 1112-A and the attachment portion 1114. In another embodiment, the fin member 1110 is a thin sheet of material that is preformed with a joint 1118 and/or a non-planar fin 1112-A. In one such an embodiment, the fin member 1110 is a thin plastic material with a fixed configuration.

Proximate the joint 1118 is an opening 1402 in the fin 1112-A. The opening 1402 is positioned and sized to receive the fish hook 1106 such that the eyelet 1108 is on one side of the fin 1112-A and the shank 1104 is on the other. When the fin member 1110 is attached to the body 1102, the opening 1402 is aligned with the groove or slot 1202 in the surface 1120 of the body 1102 such that the shank 1104 of the hook 1106 passes through the opening 1402.

FIG. 15 illustrates a bottom view of another embodiment of a tackle 1100-B with a fin 1112-A. FIG. 16 illustrates a side view of the tackle 1100-B with the fin 1112-A. The illustrated tackle 1100-B is a sinker or weighted attachment. The tackle 1100-B includes a body 1102'. The body 1102' has an oblong oval shape when viewed normal to the surface 1202 of the body 1102'. The body 1102' has a channel 1202 with a tube 1502 that is sandwiched between the body 1102' and the fin member 1110. Inside the tube 1502 is a shaft 1504 with opposing eyelets 1506. The shaft 1504 freely rotates within the tube 1502 such that the body 1102' rotates about the shaft 1502. A portion of the shaft 1504 engages the opening 1402 in the fin member 1110 with one eyelet 1506 protruding beyond the fin 1112-A.

The tube 1502 is a bushing for the shaft 1504 to freely rotate inside. The tube 1502 is also a barrier that prevents the adhesive securing the fin member 1110 to the body 1102' from binding the shaft 1504 and preventing its free rotation relative to the body 1102'. In one embodiment, the tube is a material that is sufficiently resilient to receive an eyelet 1506 attached to the shaft 1504, thereby enabling the assembly of the tube 1502 and shaft 1504. In another embodiment of the tackle 1100-B, the eyelet 1506 is fixedly secured to the body 1102' and a swivel connector is used to allow the tackle 1100-B to spin and rotate when the tackle 1100-B is deployed for fishing and is moving relative to the water.

The attachment portion 1114' has a shape that generally conforms to the oblong oval shape of the surface 1202. The attachment portion 1114' is sandwiched between a reflective sheet 1116' and the surface 1202 of the body 1112'. In the illustrated embodiment, the reflective sheet 1116' is sized smaller than the attachment portion 1114'. In other embodiments the reflective sheet 1116' and the attachment portion 1114' are sized such that the reflective sheet 1116' extends beyond the perimeter of the attachment portion 1114'. In the illustrated embodiment, the reflective sheet 1116' has a diamond pattern that is reflective and/or iridescent. In other embodiments the reflective sheet 1116' has other patterns or no pattern at all and the surface of the sheet 1116' is reflective and/or iridescent.

When the tackle 1100-B is positioned inline between the fishing line and a fishhook with the fin 1112-A proximate the fishing line, the fin 1112-A creates instability in the tackle 1100-B such that the tackle 1100-B moves and rotates relative to the direction of travel of the tackle 1100-B through the water. When the eyelet 1506 proximate the fin 1112-A is suspended from the lead line, the tackle 1100-B will move and rotate when the tackle 1100-B moves relative to the water.

FIG. 17 illustrates a plan view of yet another embodiment of a tackle 1100-C with a double fin 1112-B. FIG. 18 illustrates an end view of the tackle 1100-C with a double fin 1112-B. The illustrated tackle 1100-C is a spinner-type device similar to the sinker or weighted attachment illustrated in FIGS. 15 & 16. Two bodies 1102 sandwich the fin member 1110-B to form a tackle 1100-C that is symmetrical about the axis of rotation, which is around the shaft 1504.

The fin member 1110-B has two fins 1112-B that protrude laterally from where the two bodies 1102 are joined. The fins 1112-B are swept back toward the aft end of the bodies 1102 with a V-shaped configuration. Each fin 1112-B has a deformity 1302 that causes the fins 1112-B to act like a propeller to force the tackle 1100-C to spin in a direction 1802. When the tackle 1100-C is in the water and is moving relative to the water, the fins 1112-B cause the tackle 1100-C to spin about the shaft 1504.

The distal ends of the fins 1112-B are curved at a fold 1302' that defines an arcuate surface connecting the planar surface of the attachment portion 1114 of the fin member 1110-B to the extreme distal end of each fin 1112-B. The folds 1302' are disposed on opposing sides of the fin member 1110-B so as to induce a rotary or spinning motion to the tackle 1100-C in the direction 1802 indicated on FIG. 18. In various embodiments, the angle and amount of curvature of the fold 1302' is varied and/or the angle and amount of curvature in the two fins 1112-B differs.

In one embodiment, the fin member 1110-B is formed from a single sheet of a stiff material, such as metal or plastic. The fin member 1110-B has a longitudinal depression that engages the channel 1202 in one body 1102. A tube 1502 engages the channel 1202 in the other body 1102 and also engages the longitudinal depression in the fin member 1110-B. In this way the surface 1120 of each body 1102 is flush with the corresponding side of the fin member 1110-B and the shaft 1504 is free to rotate within the tube 1502. In another embodiment, the shaft 1502 is disposed in a channel of one of the bodies 1102 without a tube 1502 such that the shaft is fixed to the bodies 1102 and fin member 1110-B. In such an embodiment, a swivel or other bearing member is attached to the eyelet and the lead line to allow the tackle 1100-C to spin about an axis defined by the shaft 1502.

Figure 19:
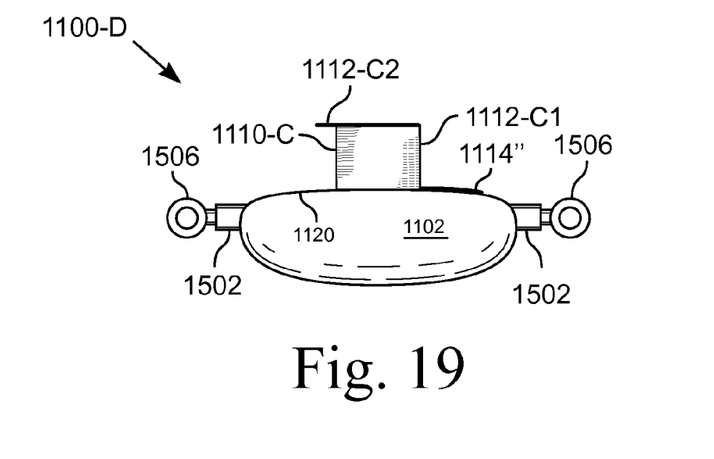
FIG. 19 is a side view of still another embodiment of a tackle with another embodiment of a fin.
Figure 20:
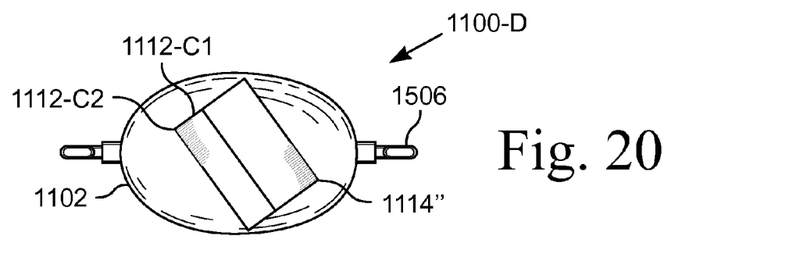
FIG. 20 is a bottom view of the tackle with the fin.
Figure 21:
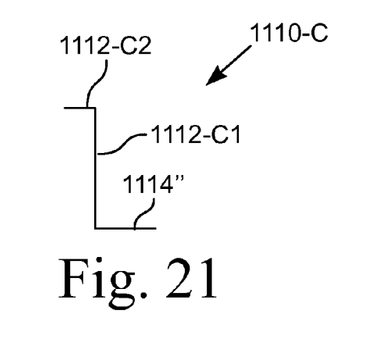
FIG. 21 is a side view of the embodiment of the fin shown in FIGS. 19 and 20.

FIG. 19 illustrates a side view of still another embodiment of a tackle 1100-D with another embodiment of a fin member 1110-C. FIG. 20 illustrates a bottom view of the tackle 1100-D with the fin member 1110-C. FIG. 21 illustrates a side view of the embodiment of the fin member 1110-C. The illustrated tackle 1100-D is a sinker or weighted attachment such as illustrated in FIGS. 15 & 16.

The fin member 1110-C protrudes upward from the surface 1120 of the body 1102 in a direction opposite that of the domed surface of the body 1102. The fin member 1110-C has an attachment portion 1114'' that is secured to the surface 112.

The fin member 1110-C has a folded fin 1112-C, which has a first member 1112-C1 that is perpendicular to the attachment portion 1114" and a second member 1112-C2 that is parallel to the attachment portion 1114" with the first member 1112-C1 between the attachment portion 1114" and the second member 1112-C1.

The fin member 1110-C is secured to the surface 1120 with the plane of the first member 1112-C1 intersecting the shaft 1504 at an angle, that is, the shaft 1504 is not normal to the plane of the first member 1112-C1. The angled configuration aids in destabilizing the tackle 1100-D when the tackle 1100-D moves relative to the water.

When the tackle 1100-D is in the water and is moving relative to the water, the fin member 1110-C causes the tackle 1100-D to be unstable and to wander or move erratically in the water. The amount of instability is adjustable by changing the angle of the fin members 1112-C1, 1112-C2 relative to the attachment portion 1114" or by deforming the fin members 1112-C1, 1112-C2 into a non-planar configuration. For example, the first member 1112-C1 and/or the second member 1112-C2 are adjustable to either an acute or obtuse angle relative to the attachment portion 1114'. A similar example is to flip the second member 1112-C2 such that the fin member 1110-C has a channel or C-shaped configuration, similar to the configuration shown in FIG. 22. In another example the first member 1112-C1 and/or the second member 1112-C2 are deformed by creasing, folding, bending, or otherwise making one or both of the members 1112-C1, 1112-C2 non-planar.

Figure 22:
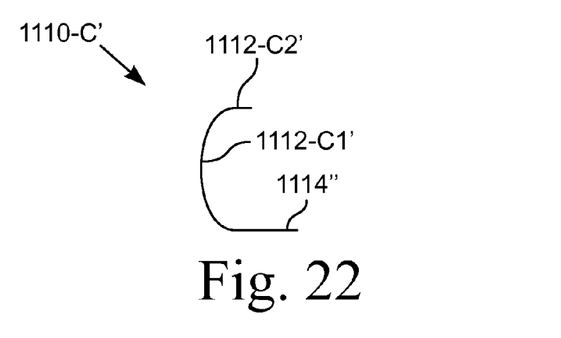
FIG. 22 is a side view of another embodiment of a fin.

FIG. 22 illustrates a side view of another embodiment of a fin 1112-C'. The illustrated embodiment shows a curved profile in which the water moving relative to the tackle 1100-D is caught in a cup formed from the first and second members 1112-C1', 1112-C2'. The embodiment illustrated in FIG. 22 is similar to that of FIG. 21 except that there are no sharp corners or edges. The illustrated embodiment allows the fin member 1110-C' additional flexibility in adjusting the fin 1112-C1', 1112-C2' by adjusting the distance separating the attachment portion 1114" from the second member 1112-C2'.

Figure 23:
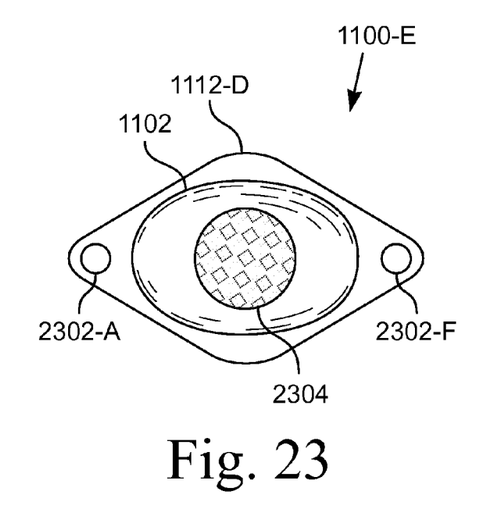
FIG. 23 is a plan view of yet another embodiment of a tackle.
Figure 24:
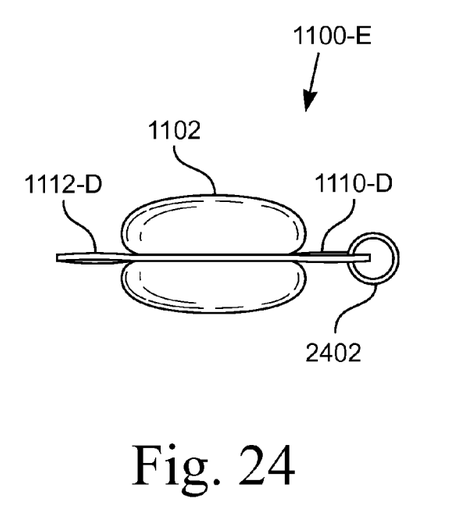
FIG. 24 is a side view of one embodiment of the tackle shown in FIG. 23.

FIG. 23 illustrates a plan view of yet another embodiment of a tackle 1100-E. FIG. 24 illustrates a side view of one embodiment of the tackle 1100-E shown in FIG. 23. The tackle 1100-E has a fin 1112-D to which a pair of bodies 1102 are attached to opposing sides of the fin member 1110-D. In another embodiment, a single body 1102 is attached to one side of the fin member 1110-D.

The fin 1112-D includes a forward opening 2302-F and an aft opening 2302-A. In various embodiments, a fishing line or lead line attaches directly to the forward opening 2302-F or to a ring 2402, swivel, or other attachment member that engages the forward opening 2302-F. The fishhook is connected to the aft opening 2302-A directly or by ring, swivel, lead line, or other attachment member. The embodiment illustrated in FIGS. 23 & 24 replaces the eyelet 1108, 1506 with the openings 2302, thereby eliminating the need for a channel in the body 1102.

In the illustrated embodiment, the bodies 1102 are clear cabochons and a reflective sheet 214 is sandwiched between the body 1102 and the fin 1112-D. A clear or translucent adhesive secures the body 1102 to the fin 1112-D. In this way the reflective sheet 2304 is visible through the body 1102 and the domed shape of the body 1102 is a lens that allows incident light falling on the reflective sheet 2304 to be reflected.

The fin 1112-D is a thin sheet of stiff material. In one embodiment, the fin 1112-D is a thin metal and rings 2402, swivels, or other attachment members are used to connect line to the tackle 1100-E. In another embodiment, the fin 1112-D is plastic or other material to which a fishing line is directly attachable.

In one embodiment the fin 1112-D is planar. In other embodiments, the fin 1112-D is non-planar with one or both ends having a twist or other deformity that causes the tackle 1100-E to move erratically or randomly through the water when deployed for fishing. FIG. 24 illustrates the fin 1112-D with opposing twists on the forward and aft ends of the fin 1112-D. In another such embodiment, one or both ends have a curved bend positioning the distal end above or below the plane of the non-deformed fin 1112-D. In yet other embodiments, one or both of the lateral portions of the fin 1112-D are deformed to deflect water flow over the tackle 1100-E and thereby induce motion. For example, one or both the lateral portions of the fin 1112-D have a bend or a twist such that the fin 1112-D is non-planar. In other examples, the fin 1112-D has a shape different than the illustrated diamond-shape, which such shape configured to induce motion of the tackle 1100-E when the tackle moves relative to the water.

The tackle 1100 includes various functions. The function of creating instability of the tackle 1100 is implemented, in various embodiments, by the shape and configuration of the fin 1112-A, 1112-B, 1112-C1, 1112-C2, 1112-C1', 1112-C2', 1112-D.

From the foregoing description, it will be recognized by those skilled in the art that a fishing tackle 1100 has been disclosed. The tackle 1100 has a motion inducing fin 1112 that causes the tackle 1100 to move through the water with a motion that entices fish to strike.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for attracting fish, said apparatus comprising:
    a body being a glass cabochon, said body being partially ovoid with a surface that is substantially flat, said body including a channel extending between a forward end and an aft end of said body, said forward end proximate a leading portion of said body when said body is deployed for fishing, said channel proximate said surface of said body;
    an eyelet to which a line is attachable, said eyelet protruding from said channel proximate said forward end of said body; and
    a member for inducing motion, said member having an attachment portion connected to a fin, said attachment portion secured to said surface of said body with said fin extending beyond a perimeter of said surface, said fin forming an obtuse angle with respect to said attachment portion, said fin being a malleable material whereby said fin is bendable into a non-planar shape and retains said non-planar shape when deployed for fishing, and said fin including an opening through which said eyelet protrudes, said opening located medially in said member proximate said attachment portion.

2. The apparatus of claim 1 further including a tube in said channel, said eyelet connected to a shaft, said shaft disposed within said tube, and said shaft free to rotate within said tube.

3. The apparatus of claim 1 wherein said channel receives a shank of a fishhook, said fishhook having a hook end disposed on a side of said surface opposite a portion of said body that is partially ovoid, and said eyelet being one end of said fishhook.

4. The apparatus of claim 1 wherein said body is positioned within said obtuse angle between said attachment portion and said fin.

5. The apparatus of claim 1 further including a reflective sheet proximate said attachment portion.

\* \* \* \* \*